United States Patent
Moriarty et al.

(10) Patent No.: US 7,233,873 B2
(45) Date of Patent: Jun. 19, 2007

(54) ROTOR POSITION DETECTION IN AN ELECTRICAL MACHINE

(75) Inventors: Peter Mark Moriarty, Knaresborough (GB); Michael Paul Tankard, Harrogate (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 11/186,553

(22) Filed: Jul. 21, 2005

(65) Prior Publication Data

US 2006/0036384 A1  Feb. 16, 2006

(30) Foreign Application Priority Data

Jul. 27, 2004 (GB) ................... 0416736.7

(51) Int. Cl.
*G01C 17/38* (2006.01)
*G01P 21/00* (2006.01)
*G06F 19/00* (2006.01)

(52) U.S. Cl. ................ 702/94; 318/701; 702/93
(58) Field of Classification Search ............... 702/94; 318/701
See application file for complete search history.

(56) References Cited

U.S. PATENT DOCUMENTS

| | | | |
|---|---|---|---|
| 4,972,333 A | 11/1990 | Isikawa | |
| 5,170,365 A | 12/1992 | Collopy et al. | |
| 5,225,746 A | 7/1993 | Von der Heide et al. | |
| 5,467,025 A | 11/1995 | Ray | |
| 5,786,646 A | 7/1998 | Newberg et al. | |
| 5,877,568 A | 3/1999 | Maes et al. | |
| 6,147,626 A | 11/2000 | Sakakibara | |
| 6,586,903 B2 | 7/2003 | Moriarty | |
| 6,661,140 B2 | 12/2003 | Agnes et al. | |
| 6,826,499 B2 | 11/2004 | Colosky et al. | |
| 2002/0125852 A1* | 9/2002 | McClelland et al. ........ 318/701 |
| 2006/0005605 A1 | 1/2006 | Moriarty | |
| 2006/0009936 A1 | 1/2006 | Moriarty et al. | |
| 2006/0036385 A1 | 2/2006 | Tankard | |

FOREIGN PATENT DOCUMENTS

| | | |
|---|---|---|
| EP | 0 391 647 A3 | 10/1990 |
| EP | 0 573 198 A1 | 12/1993 |
| EP | 0 780 966 A2 | 6/1997 |
| EP | 1 014 556 A1 | 6/2000 |
| EP | 1 109 309 A2 | 6/2001 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

* cited by examiner

*Primary Examiner*—Bryan Bui
*Assistant Examiner*—Sujoy Kundu
(74) *Attorney, Agent, or Firm*—Haynes and Boone, LLP

(57) ABSTRACT

An electrical machine has a rotor position transducer which provides output signals to a control system. The output signals contain errors due to component shortcomings and manufacturing imperfections. A method is disclosed which is able to determine the errors in the signals by successively running the machine with a series of assumed errors in the rpt signals and building up a set of test results. These results are subsequently compared with each other so as to determine the optimum value of corrections to the control system of the machine. The correction may be stored in the control system and used to improve the accuracy of the transducer output signals, thus improving the output of the machine.

10 Claims, 5 Drawing Sheets

Inductances

Phase A

Phase B

Phase C

Sensor signals $RPT_A$ $RPT_B$ $RPT_C$

Combined signal

ROTOR POSITION DETECTION IN AN ELECTRICAL MACHINE

CROSS-REFERENCE TO RELATED APPLICATION

The subject matter of this application is related to the subject matter of British Patent Application No. GB 0416736.7, filed Jul. 27, 2004, priority to which is claimed under 35 U.S.C. § 119 and which is incorporated herein by reference.

BACKGROUND OF THE INVENTION

1. Field of the Invention

Embodiments of this invention relate to the compensation of errors in the rotor position detector of an electrical machine and particularly, but not exclusively, of a switched reluctance machine.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, 21–24 Jun. 1993, incorporated herein by reference. A general treatment of the drives can be found in various textbooks, e.g. "Electronic Control of Switched Reluctance Machines" by TJE Miller, Newnes, 2001, incorporated herein by reference. FIG. 1 shows a typical switched reluctance drive in schematic form, where the switched reluctance motor 12 drives a load 19. The input DC power supply 11 can be either a battery or rectified and filtered AC mains. The DC voltage provided by the power supply 11 is switched across the phase windings 16 of the motor 12 by a power converter 13 under the control of the electronic control unit 14. Current sensor 18 determines current in at least one of the phases.

The switching must be correctly synchronized to the angle of rotation of the rotor for proper operation of the drive. A rotor position transducer ('rpt') 15 is typically employed to supply signals corresponding to the angular position of the rotor. The rpt 15 is a device that outputs a binary signal having two transitions per machine phase period and is periodic with an electrical cycle of the machine. The transitions are indicative of events in the electrical cycle of the machine, for example occurrences of maximum and minimum inductance, or positions closely adjacent such events, in relation to which a control action is to take place.

Typically, a set of control laws is programmed into the control unit 14 and these laws are used to operate the drive in response to user demands such as speed or torque. The laws are frequently written in terms of control angles, e.g.: an angle at which excitation is applied to a phase winding; a second angle at which the excitation is removed from the phase; and a third angle describing the duration of any freewheeling period used. While techniques exist for determining these laws empirically for each drive during commissioning, it is more common for a prototype drive to be tested in detail, the control laws determined, and these laws programmed into successive models of the drive, on the assumption that the drives are sufficiently similar that the small differences in performance are insignificant. This procedure does, however, rely on the assumption that the rpt of each drive is accurately built and aligned.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A resistor 28 is connected in series with the lower switch 22 to provide a current feedback signal. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter. A polyphase system typically uses several "phase legs" of FIG. 2 connected in parallel to energize the phases of the electrical machine. Instead of the current-measuring resistor, an isolated and/or non-invasive current detector may be used.

The phase inductance cycle of a switched reluctance machine is the period of the variation of inductance for the, or each, phase, for example between maxima when the rotor poles and the relevant respective stator poles are fully aligned. An idealized form of the inductance curve for a phase is shown in FIG. 3(a). In practice, the sharp corners at $L_{min}$ and $L_{max}$ are rounded due to flux fringing and to saturation of the magnetic circuits. The maximum value of inductance would also be current dependent. Nevertheless, this curve is useful to illustrate the general behavior of the machine. As explained in more detail in the Stephenson paper cited above, the maximum inductance region, $L_{max}$, is centered around the rotor position where a pair of rotor poles are fully aligned with a pair of stator poles. This is shown for Phase A of a 3-phase, 6-pole stator, 4-pole rotor machine in FIG. 3(b). Similarly, the minimum inductance region, $L_{min}$, corresponds to the position where the interpolar axis on the rotor is aligned with the stator pole axis, as shown in FIG. 3(c).

The performance of a switched reluctance machine depends, in part, on the accurate timing of phase energization with respect to rotor position. Detection of rotor position is conventionally achieved by using a rotor position transducer 15, shown schematically in FIG. 1, such as a rotating toothed disc mounted on the machine rotor, which co-operates with an optical or magnetic sensor mounted on the stator. A pulse train indicative of rotor position relative to the stator is generated and supplied to control circuitry, allowing accurate phase energization. Typically, a single sensor is used for 1- and 2-phase systems; three sensors for a 3-phase system; and either 4 or 2 sensors for a 4-phase system. Simpler arrangements using only one sensor are occasionally used in systems with three or more phases. Such types of position transducers have a much poorer resolution than, say, a resolver or encoder but are considerably less costly. While it is possible to use highly accurate sensors, the cost involved would have an impact on the overall cost of the drive, particularly in small, low-cost drives.

FIG. 4 shows in schematic form the essential components of such a rotor position transducer (rpt) for a 3-phase system. The vane 40 is proportioned so as to give an equal mark: space ratio on the outputs of the three sensors. The sensors are distributed around the perimeter of the vane at angles which correspond to the displacement angles of the inductance profiles of the phases, and are typically set relative to the stator poles to give rising and falling edges at $L_{min}$ and $L_{max}$, respectively. This results in the signals from the sensors having relationships with the inductance profiles of the phases as shown in FIG. 5. As stated above, the rpt 15 is a device that outputs a binary signal having two transitions per machine phase and is periodic with an electrical cycle of the machine. The transitions are indicative of events in the electrical cycle of the machine, for example occurrences of maximum and minimum inductance, or positions closely adjacent such events, in relation to which a control action is to take place. These signals are typically used by the control system to generate the correct instants for energization of the windings of the machine in accordance with the predetermined control laws. Since the performance of the machine is critically dependent on the accuracy of such energization, it is important that the components of the rpt are accurately made and aligned.

Several sources of error are commonly found in the rpt. Furthermore, the output of a batch of rpts is not consistent so that each should, ideally, be adjusted individually. The mark:space ratio of the vane obviously affects the mark:space ratio of the output signal, though the relationship is not entirely straightforward, since it is also affected by the properties of the type of sensor used in the rpt. For example, if the sensor is of the optical type, it will have a finite beam width. This will influence the signal differently, depending on whether the transition is from light transmitting to light blocking or vice versa. If the sensor is of the Hall-effect type, then the proximity of the incoming edge of the ferromagnetic vane will give rise to fringing of the magnetic flux and earlier switching than would be expected. In addition, both of these types of sensor can suffer from hysteresis effects, giving variations in signal output depending on the direction of rotation. In order to counter these effects, it is known to adjust the physical mark:space ratio of the vane so as to give a sensor output which is more nearly unity mark:space. It is also known to offset the alignment of the vane on the rotor in order to at least partially compensate for hysteresis, magnetization precision, beam-width and/or fringing effects. Nevertheless, it is not usually possible to compensate simultaneously for all the errors, so at least some errors usually remain in the output signals.

These errors, however, are only part of the problem. It will be evident from FIG. 4 that both the absolute position of a sensor relative to the stator and its position relative to the other sensors will affect the phase of the $RPT_A$, $RPT_B$ and $RPT_C$ signals relative to the inductance profile of their phase. Methods have therefore been developed to reduce manufacturing errors in the placement of the sensor components, which are normally arrayed on a printed circuit board. For example, U.S. Pat. No. 5,877,568 and U.S. Pat. No. 6,661,140, both incorporated herein by reference, both disclose methods of improving the alignment of the sensors with the stator, though at the expense of additional components and manufacturing processes.

Similarly, the alignment of the vane relative to the rotor poles affects the phase relationship of the rpt signals with the respective inductance profiles. Among known methods for reducing this error is that disclosed in U.S. Pat. No. 5,786,646, incorporated herein by reference, which uses a specially designed clamp ring and appropriate tooling to fix the vane in a known relationship with the rotor poles.

These methods, while going at least some way to improving the quality of the rpt output, are expensive in terms of added components, manufacturing processes and/or set-up costs. While this may be acceptable in high-value drives manufactured in low volumes, it is not desirable for low-cost, high-volume drives as used in, e.g., domestic appliances or automotive systems. Nevertheless, such low-cost systems still require accurate rpt signals to produce the high output required of them. There is therefore a need for a method of compensating for the error in the rpt signals in a repeatable and cost-effective way.

SUMMARY OF THE INVENTION

Embodiments of the invention are particularly applicable for determining error in the output of a rotor position transducer providing binary signals and being arranged in relation to the rotor of an electrical machine to produce no more than two transitions in the binary signals in a phase inductance cycle.

The techniques discussed in this patent application are quite distinct from known compensations used in resolver or encoder systems. Such systems have high resolution over a mechanical revolution. Compensation for their circumferential misalignment to a shaft can be done by reading, say, the encoder output at two positions and noting the offset in its output, which may be a few counts of position, but can never be less than the resolution of the encoder. Embodiments of this invention, on the other hand, allow correction of an error which is much less than the resolution of the rpt (but still significant with respect to the performance of the drive system).

Embodiments of the invention may compare the results from several test runs of the drive with each other so as to determine the desired compensation of the rpt of the machine under test compared with the machine from which the control laws of the drive were determined. This comparison can be done at the end of the manufacturing process. The compensation can then be loaded into the control system of the drive so that, when the drive is operating normally in its intended application, the drive is controlled by signals from the rpt which are appropriately compensated.

Embodiments of the present invention are able to derive error from comparison of the test results to provide optimum performance for the specific application. The accuracy of the selected output compensation is, thus, dependent on the accuracy of the testing and not on the resolution of the rpt.

BRIEF DESCRIPTION OF THE DRAWINGS

Embodiments of the invention will be described with respect to the figures, in which like reference numerals denote like elements, and in which.

DETAILED DESCRIPTION

An illustrative embodiment to be described uses a 3-phase switched reluctance drive in the motoring mode, but any phase number could be used, with the drive in either motoring or generating mode, i.e. producing output as a torque or force, or as electrical power, respectively.

Figure 1:
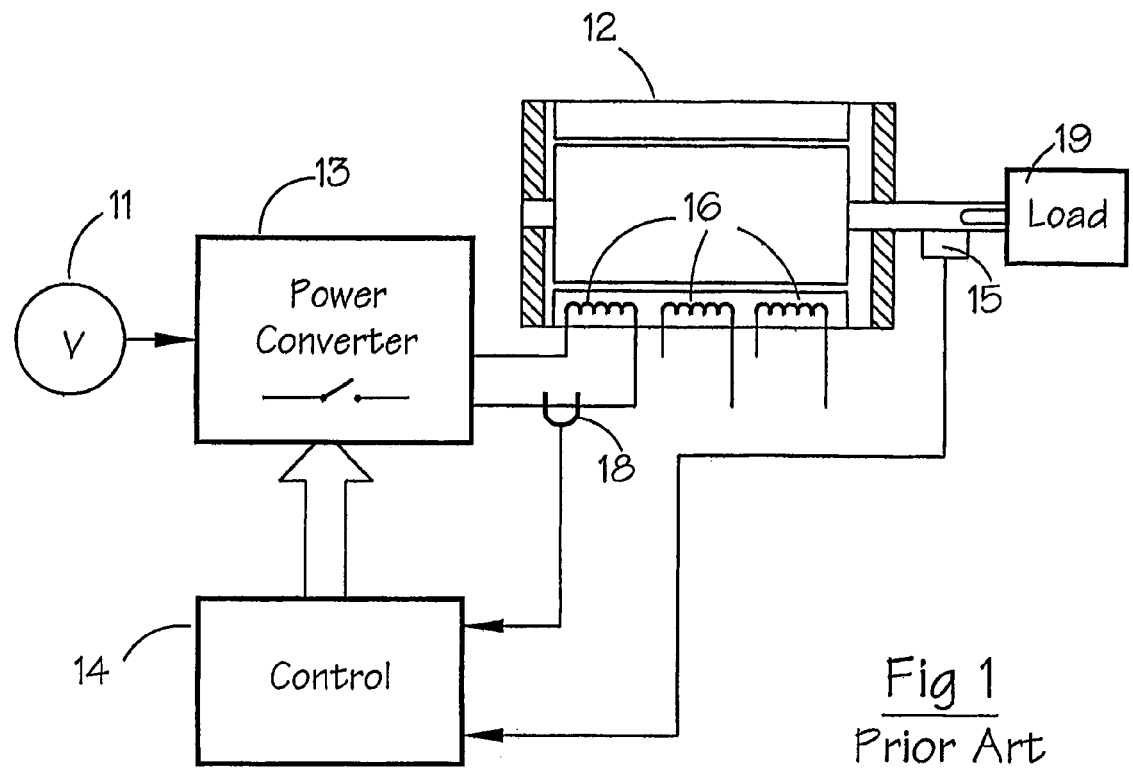
FIG. 1 shows a typical prior art switched reluctance drive.
Figure 2:
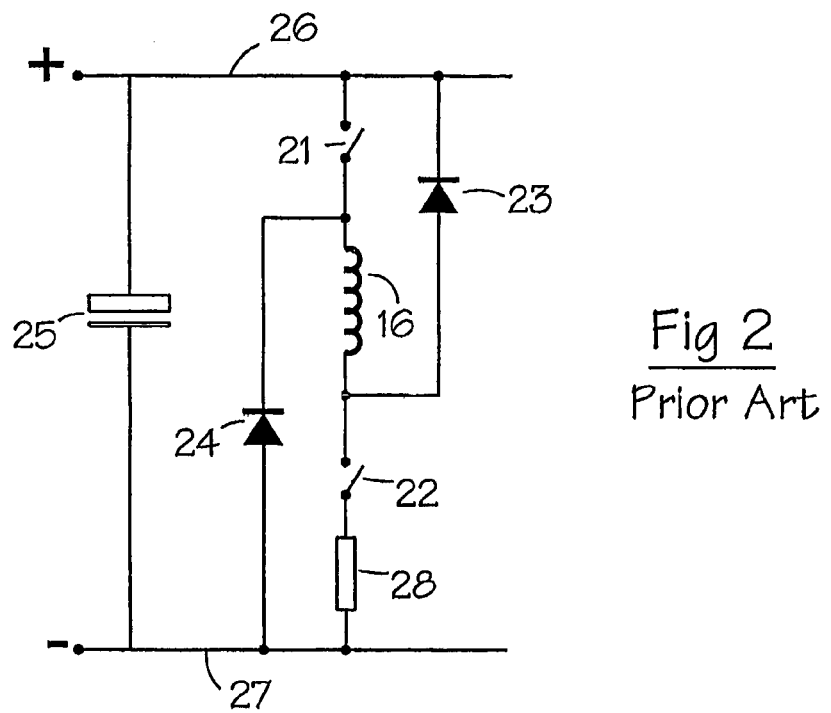
FIG. 2 shows a known topology of one phase of the converter of FIG. 1.
Figure 3A:
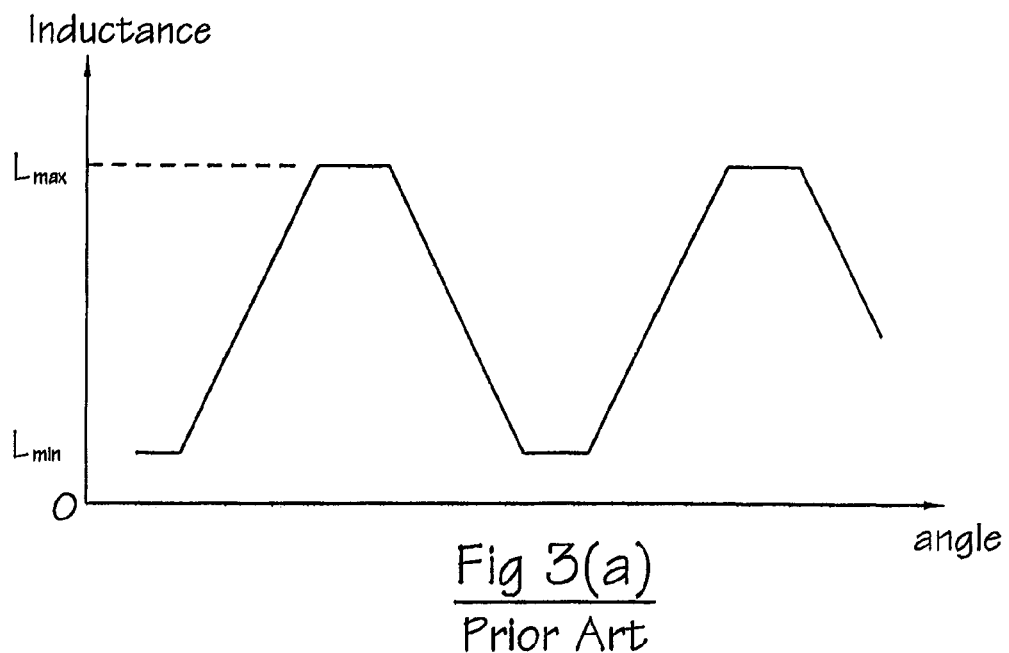
FIG. 3(a) shows an idealized inductance profile of a switched reluctance machine as a function of rotor angle.
Figure 3B:
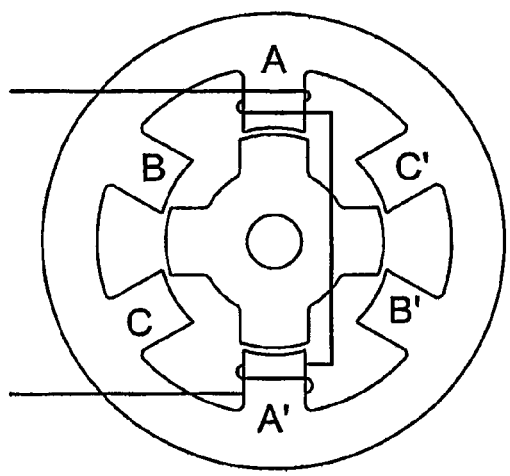
FIG. 3(b) shows a schematic view of a switched reluctance machine with the rotor in the fully aligned ($L_{max}$) position for Phase A.
Figure 3C:
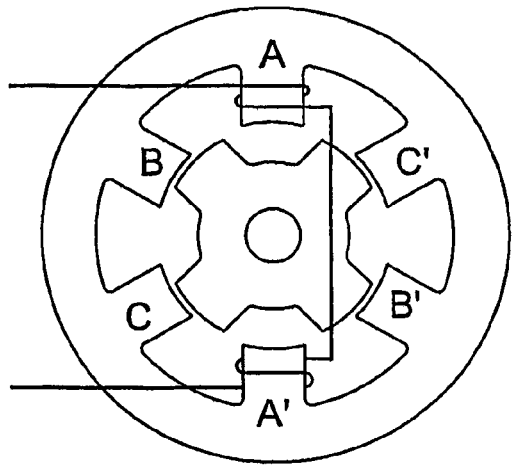
FIG. 3(c) shows a schematic view of a switched reluctance machine with the rotor in the fully unaligned ($L_{min}$) position for Phase A.
Figure 4:
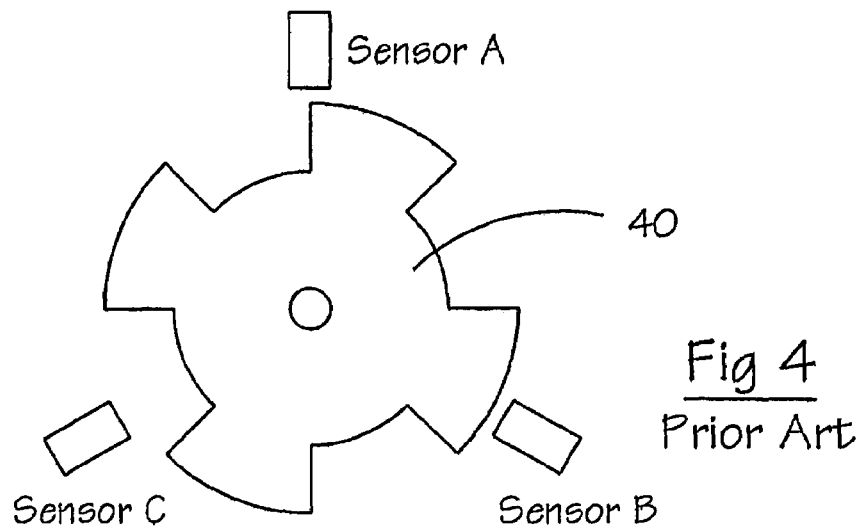
FIG. 4 shows the elements of a rotor position transducer for a 3-phase system.
Figure 6:
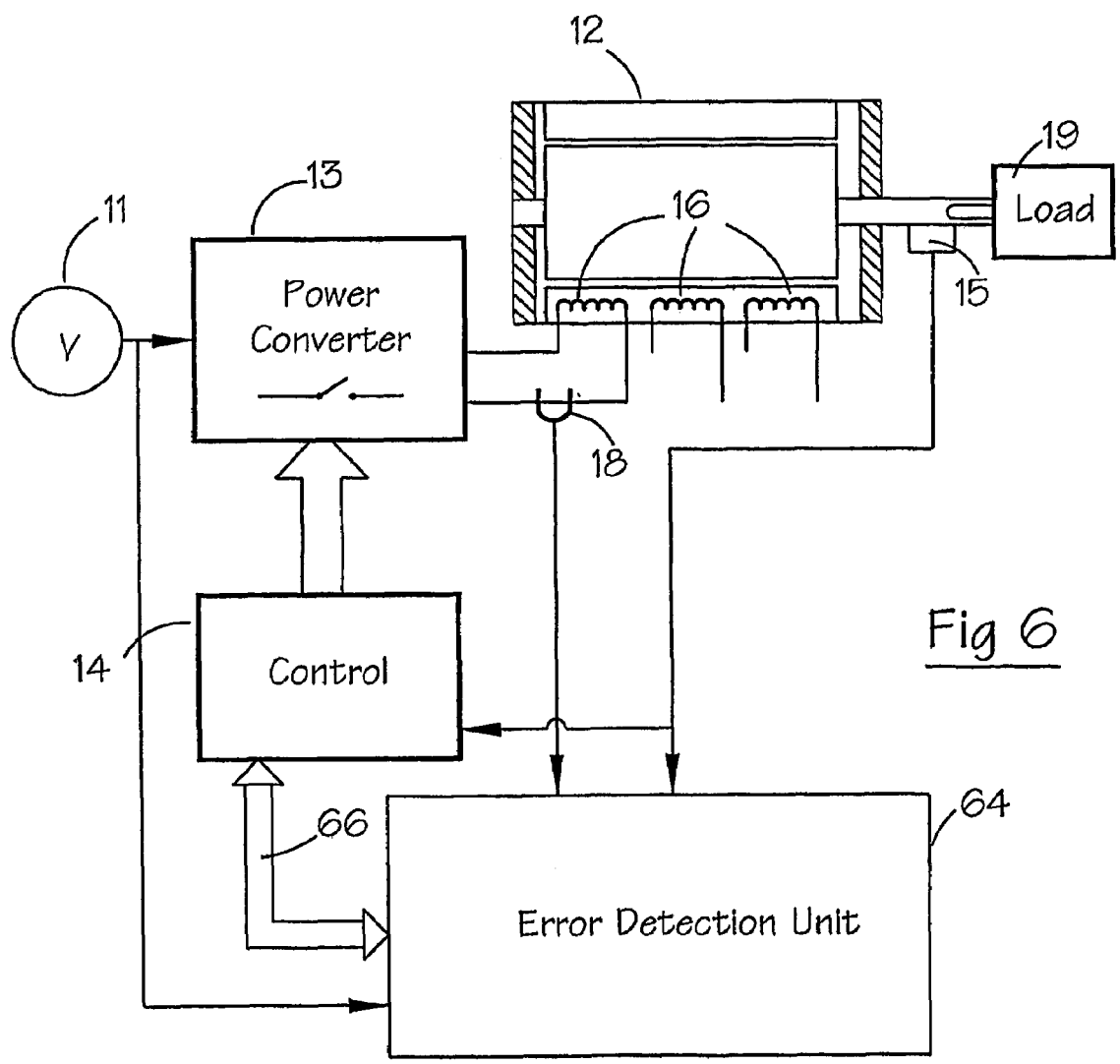
FIG. 6 shows an apparatus according to one embodiment of the invention.
Figure 5:
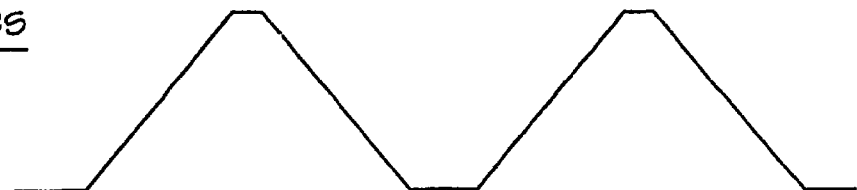
FIG. 5 shows the relationship between the inductance profiles and sensor signals for the transducer of FIG. 4.
Figure 5:
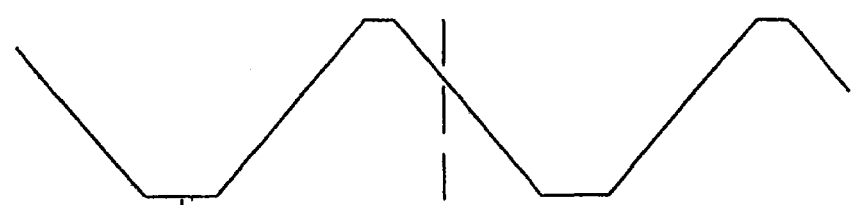
Figure 5:
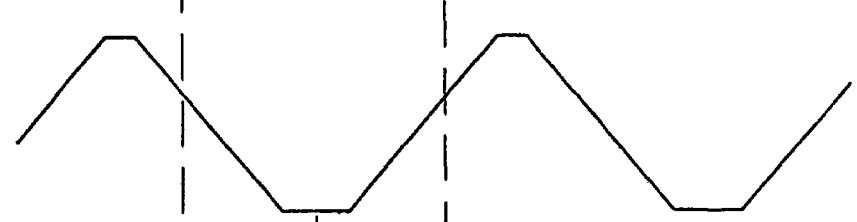
Figure 5:
Figure 5:
Figure 5:
Figure 5:

Referring to FIG. 6, a switched reluctance ('SR') drive as shown in FIG. 1 is set up to be run in association with an error detection unit 64. The rpt 15 is as shown in FIG. 4, typically with an output relationship to the inductance cycle for each phase of the machine as shown in FIG. 5. The rpt has two transitions between binary output states in a phase inductance cycle, as shown in FIG. 5, and the signals from the rpt are fed to the error detection unit as well as to the control system 14 of the drive. In some embodiments of the invention, the error detection unit is able to determine the current in at least one of the phases of the machine, by means of current sensor 18. Signals from other current sensors associated with other phases may optionally be supplied to the error detection unit 64.

FIG. 6 shows the motor connected to a load 19. In practice, this load can be omitted for ease of test, or it can be a simple flywheel attached to the shaft to increase the inertia and reduce speed ripple, or it can be a conventional load which requires torque from the motor. In the latter case, the increased phase currents may allow more accurate determination of drive performance and hence more accurate determination of the desired compensation in the rpt. If the test is to be done in the generating mode, the load 19 must be capable of providing torque to the SR machine 12.

In one embodiment of the invention, the machine 12 is run by its own power converter 13 under the control of the control unit 14, responsive to signals from rpt 15. The control unit implements the control laws programmed into the drive which are appropriate for a drive with a correctly constructed and aligned rpt. The control unit 14 is also able to accept a value of rpt compensation from the error detection unit 64 which is used to offset the control laws relative to the position signalled by the rpt. The drive system is operated against a known load and a selection of parameters, indicative of performance, is recorded by the error detection unit. The parameters included in the selection are determined in advance and may include some or all of the supply voltage, the DC link current, the phase current(s), the efficiency, the power factor seen by the supply, the harmonic voltages or currents injected back to the supply, the machine rate of change of output (e.g. acceleration), the machine output (e.g. torque), torque ripple, machine vibration, acoustic noise, temperature of machine component, etc. Other embodiments of the invention use a waveform as one of the parameters, e.g. a waveform of current, of torque ripple or of acoustic noise.

In a first test of the rpt 15 carried out according to a program running in the control unit 14, the machine 12 is run using the control laws programmed into the algorithm. The output of the rpt 15 is used in an unmodified form as the rotor position feedback information. The error detection unit 64 is programmed to add a positive or a negative increment to the candidate rotor position compensation values produced before it is applied to the control laws. Subsequent tests use the output of the rpt 15. For each setting of rpt output compensation, the chosen performance parameter (or set of parameters) is recorded for later comparison.

This process uses a series of different candidate values of rpt compensation. The error detection unit then assesses the results of the tests by comparing the parameter values to determine the candidate value of compensation which gives the "best" result. The choice of "best" result will be influenced by the particular application for the drive. For example, drive efficiency could be an appropriate parameter to maximize if the drive is supplied from a battery; peak current could be minimized if there is a limit imposed by the switching devices; time to reach a certain speed could be minimized if the acceleration of the drive is a critical parameter. Many other such comparisons e.g. temperature of the machine winding or some other component, vibration or acoustic noise, will be apparent to one skilled in the art.

The comparisons to produce the optimum compensation value may be done manually, e.g. by consulting a table containing the test results, but it is advantageous for embodiments of the invention to do the comparisons automatically by the error detection unit 64. The compensation increment, and direction of the increment (positive and negative), is automatically set to produce a set of parameter values at the end of the tests. However, the compensation increment also is more adaptively determined in the test program, according to one embodiment, by monitoring the parameter value curve. Additionally to this, the monitoring may perform an iterative function to settle on an optimum value of parameter. To use an adaptive technique such as this, the error detection unit 64 optionally is loaded with a suitable genetic algorithm. The selected compensation value can then be transmitted to the control unit 14 through data bus 66 and stored in memory resident in the control unit 14. When the drive system is subsequently operated in its intended application, the control unit uses the stored compensation value to compensate the output of the rpt and to enable improved performance from the drive.

Thus the apparatus shown in FIG. 6 can be used for a one-off analysis of a drive system at the end of its manufacture to determine the desired compensation in the rpt system. This is achieved without additional or specialized components. A permanently installed current sensor may not be required for the drive. Instead of the prior art methods of seeking to minimize the error in rpt signals, embodiments of the invention accept that the outputs of rpts are subject to variation and compensate for this so as to optimize the performance of the drive according to a chosen criterion. Embodiments of the present invention have the additional benefit of enabling the machine drive to be set up for optimum performance of a chosen parameter by compensating for the rpt output regardless of its inherent inaccuracy.

Figure 7:
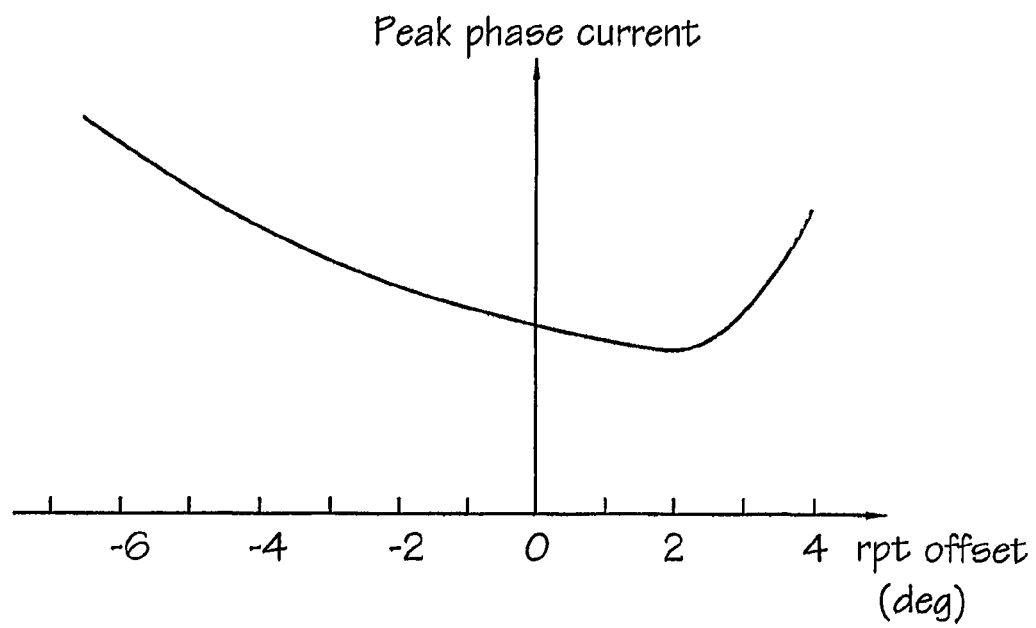
FIG. 7 shows a graph of peak phase current against rpt offset.

By way of illustration, FIG. 7 shows a graph of peak phase current against rpt offset as would be expected from test runs on an exemplary drive, if such test runs occurred, as described above. It is apparent from this curve that, to minimize the peak phase current, a value of around 2° should be chosen for the rpt error.

Figure 8:
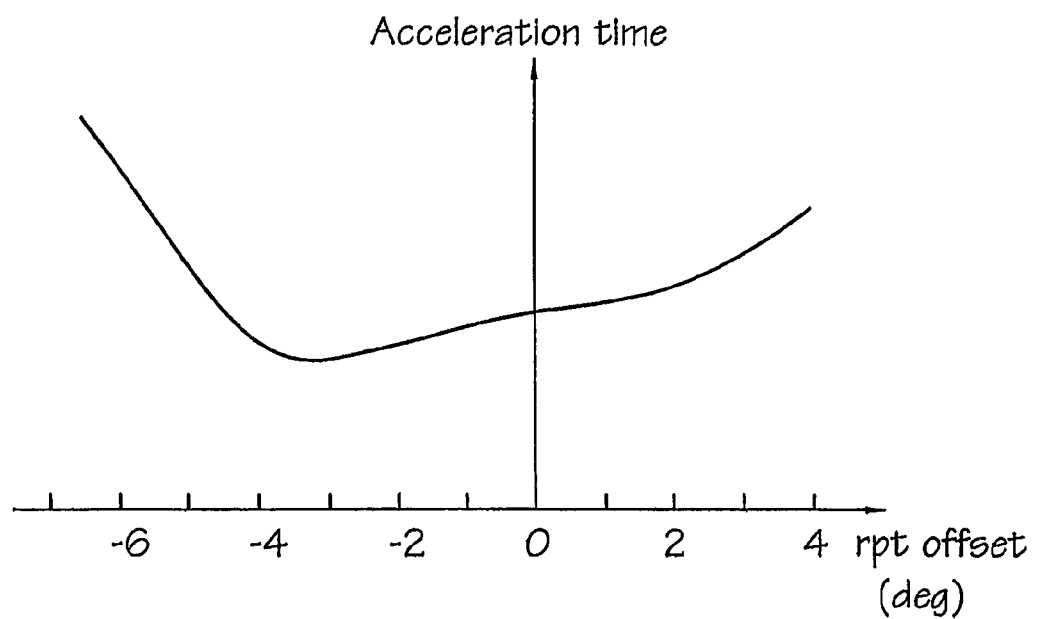
FIG. 8 shows a graph of acceleration time against rpt offset.

By way of further illustration, FIG. 8 shows the acceleration time between two chosen speeds for another exemplary drive. Again, the graph is as would be expected from test results from a series of tests with varying offset values used for the rpt signals, if such tests were run. In order to minimize the acceleration time, an offset of around −4° should be chosen.

A value of compensation may be stored and used for all the phases to save time on analysis, or the selection process can be such that a second or more phases in the machine 12 are allocated compensation values which may be used in association with the individual phases or may be averaged. Similarly, the process can be carried out on only one transition of the rpt signal or on several or all, allowing either an average offset to be calculated or storage of the actual compensation associated with each signal edge.

The stored compensation value(s) derived from the rpt calibration carried out is then applied by the control unit to the actual rpt signal transitions to compensate for inherent variability in the rpt output and/or to set the rotor output to optimize a chosen parameter performance. It will be apparent to those skilled in the art of digital signal processing that the compensation of the rpt signals could be achieved in a variety of ways once the basic rpt calibration has been performed. This could include, for example, compensation of errors relating to both rising edges and falling edges in the rpt signal. The compensation for the error could be done in either the rotor angle domain or in the time domain and the choice between the two would be influenced by the particular control implementation used by the subject system. The ultimate goal, however, remains that of ensuring that the switches controlling the phase winding(s) are operated at the correct moments and that the operation is not compromised by any error in the rpt signal(s).

It will also be appreciated by those skilled in the art that the error detection unit 64 could, to a greater or lesser degree, be integrated with the control unit 14 of the drive (see FIG. 6). Thus, it may be possible to employ the processing power of the control unit to perform the desired calculations and to store the resulting values of rpt offset compensation. Such an embodiment may allow the drive to be re-calibrated in its application if the settings of the rpt were disturbed during maintenance or repair. The re-calibration exercise could provide a new set of values to be stored and subsequently used for compensation of the rpt output signals.

The skilled person will appreciate that variations of the disclosed arrangements are possible without departing from the invention, particularly in the details of the implementation of the algorithms in the error detection unit. It will be appreciated that it is possible to store different compensation values (or sets of compensation values) to optimize different parameters so that, for example, a drive could be compensated to maximize either peak acceleration or power factor, depending on a user-selected choice. It will also be apparent that, while techniques according to embodiments of the invention have been described in relation to a switched reluctance machine, they can be used in relation to any machine using rotor position information in its control.

Also, while the embodiments of the invention have been described in terms of a rotating machine, embodiments of the invention are equally applicable to a linear machine having a stator in the form of a track and a moving part moving along it. The word 'rotor' is used in the art to refer to the movable part of both rotating and linear machines and is to be construed herein in this way. Accordingly, the above description of several embodiments is made by way of example and not for the purposes of limitation.

What is claimed is:

1. A method of determining a compensation value for the output of a rotor position transducer (rpt) of an electric machine, the method comprising;
repeatedly operating the machine under predetermined conditions and with selected candidate values of compensation applied to the output of the rotor position transducer;
recording at least one parameter of the machine as a set of test results for the candidate values of rpt output compensation;
selecting from the test results a desired value of the rpt output compensation; and
subsequently using the desired value to compensate the output of the rotor position transducer.

2. A method as claimed in claim 1 in which the machine is operated, and the test results are recorded, in accordance with a stored program.

3. A method as claimed in claim 1 in which the machine is controlled by a controller, the desired value of rpt output compensation being stored in the controller.

4. A method as claimed in claim 1 in which the parameter is one or more selected from the group consisting of supply voltage, DC link current, torque, machine output ripple, machine rate of change of output, acceleration, efficiency, supply power factor, machine vibration, voltage and current harmonics, phase current, acoustic noise and temperature.

5. A method as claimed in claim 1 in which the candidate compensation values are automatically varied for each test.

6. A method as claimed in claim 1 in which the desired value of the rpt output compensation corresponds to that producing the maximum or minimum value of the at least one parameter recorded.

7. A method as claimed in claim 1 in which the machine is controlled by a controller, the program being stored in the controller.

8. Apparatus for determining a compensation value for the output of a rotor position transducer of an electric machine according to the method claim 1, the apparatus comprising:
means for storing the test results; and
means for selecting from the test results the desired compensation value.

9. Apparatus as claimed in claim 8 in which the electrical machine is operably connected with a controller, the means for storing being integrated with the controller.

10. A method of determining a rotor position compensation value for a rotor position output of a rotor position transducer of an electric machine, the method comprising:
repeatedly operating the machine under predetermined conditions and with selected candidate values of rotor position compensation applied to the rotor position output of the rotor position transducer;
recording at least one parameter of the machine as a set of test results for the candidate values of rotor position compensation;
selecting from the teat results a desired value of the rotor position compensation: and
subsequently using the desired value to compensate the rotor position output of the rotor position transducer.

* * * * *